US010513609B2

(12) United States Patent
Cree

(10) Patent No.: US 10,513,609 B2
(45) Date of Patent: Dec. 24, 2019

(54) POLYOLEFIN ELASTOMER AND POLYSILOXANE BLENDS

(71) Applicant: Dow Global Technologies LLC, Midland, MI (US)

(72) Inventor: Stephen H. Cree, Hirzel (CH)

(73) Assignee: Dow Global Technologies LLC, Midland, MI (US)

(*) Notice: Subject to any disclaimer, the term of this patent is extended or adjusted under 35 U.S.C. 154(b) by 153 days.

(21) Appl. No.: 14/787,050

(22) PCT Filed: Jun. 2, 2014

(86) PCT No.: PCT/US2014/040488
§ 371 (c)(1),
(2) Date: Oct. 26, 2015

(87) PCT Pub. No.: WO2014/209543
PCT Pub. Date: Dec. 31, 2014

(65) Prior Publication Data
US 2016/0108239 A1  Apr. 21, 2016

Related U.S. Application Data

(60) Provisional application No. 61/838,991, filed on Jun. 25, 2013.

(51) Int. Cl.
*C08L 83/04* (2006.01)
*H01B 3/46* (2006.01)
*C08L 23/26* (2006.01)
*C09D 123/26* (2006.01)
*C09D 183/04* (2006.01)

(52) U.S. Cl.
CPC ............. *C08L 83/04* (2013.01); *C08L 23/26* (2013.01); *C09D 123/26* (2013.01); *C09D 183/04* (2013.01); *H01B 3/46* (2013.01); *C08L 2203/20* (2013.01)

(58) Field of Classification Search
CPC ...... C08L 83/04; C08L 43/04; C08L 2203/20; C08L 23/26; C08L 51/06; C08K 5/5415; C08K 5/57; C08G 77/16; C09D 123/26; C09D 183/04; H01B 3/28; H01B 3/441; H01B 3/46
See application file for complete search history.

(56) References Cited

U.S. PATENT DOCUMENTS

| 4,288,356 A * | 9/1981 | Huebner ................. C08L 83/04 524/501 |
| 5,223,495 A | 6/1993 | Inoue et al. |
| 5,492,760 A | 2/1996 | Sarma et al. |
| 6,255,392 B1 * | 7/2001 | Inoue ..................... C09D 143/04 525/100 |
| 6,479,584 B1 * | 11/2002 | Nakagawa ............... C08F 2/00 525/100 |
| 2002/0151647 A1 * | 10/2002 | Laughner ............... C08L 23/04 525/63 |
| 2003/0130420 A1 * | 7/2003 | Cree ....................... B32B 27/32 525/63 |
| 2012/0009366 A1 | 1/2012 | Galbraith et al. |

FOREIGN PATENT DOCUMENTS

| CA | 2018002 | 12/1991 |
| CA | 2105264 | 3/1994 |
| CN | 102040841 | 5/2011 |
| EP | 651009 | 5/1995 |
| WO | 1998/010724 | 3/1998 |
| WO | 2011034836 | 3/2011 |
| WO | WO 2012/106401 | * 9/2012 |

OTHER PUBLICATIONS

International Preliminary Report on Patentability for PCT/US2014/040488, dated 2015, pp. 1-6.
International Search Report and Written Opinion of the International Searching Authority for PCT/US2014/040488, dated 2014, pp. 1-8.
Iupac, Compendium of Chemical Terminology Gold Book, Graft Polymer Terminology, 2014, pp. 639.
"Rubber, vulcanized or thermoplastic—Determination of compression set—Part 1: At ambient or elevated temperatures", International Organization for Standardization, https://www.iso.org/standard/41349.html, May 16, 2018.

* cited by examiner

*Primary Examiner* — Michael B Nelson

(57) ABSTRACT

Crosslinkable polymeric compositions comprising (a) a polyolefin elastomer having hydrolysable silane groups, (b) a hydroxyl-terminated polysiloxane, (c) a polyalkoxy silane compatibilizer, and (d) a condensation catalyst. Also described are methods for preparing such crosslinkable polymeric compositions, processes for crosslinking such polymeric compositions, and the resulting crosslinked polymeric compositions themselves. Such compositions can be employed in a variety of articles of manufacture, particularly in the wire and cable industry.

5 Claims, No Drawings

POLYOLEFIN ELASTOMER AND POLYSILOXANE BLENDS

REFERENCE TO RELATED APPLICATIONS

The present application claims the benefit of U.S. Provisional Application No. 61/838,991, filed on Jun. 25, 2013.

FIELD

Various embodiments of the present invention relate to crosslinkable and crosslinked blends of polyolefin elastomers with polysiloxanes. Particularly, certain aspects of the invention concern crosslinkable and crosslinked blends of polyolefin elastomers and polysiloxanes using moisture-cure technology.

INTRODUCTION

In general, polyolefin elastomers having low crystallinity and low density are soft and flexible. However, in their un-crosslinked stated, these polymers will flow and lose dimensional stability at temperatures above the melting point of the crystalline phase of the polymer. Additionally, polyolefin elastomers can have melting points and hardness that decrease as the density and crystallinity of the polymer decreases. Thus, softer polyolefin elastomers tend to have lower melting points.

To ensure dimensional stability and mechanical properties of the polyolefin elastomer above its melting point, the polymer can be crosslinked. This process is generally known in the art to be performed via silane, peroxide, or electron beam cure processes. However, crosslinked polyolefin elastomers tend to exhibit poor compression set values. Thus, improvements are desired in the field of crosslinkable polyolefin elastomers.

SUMMARY

One embodiment is a crosslinkable polymeric composition, comprising:
  a polyolefin elastomer having hydrolysable silane groups;
  a hydroxyl-terminated polysiloxane;
  a polyalkoxy silane compatibilizer; and
  a condensation catalyst.
Another embodiment is a process comprising:
  (a) combining a polyolefin elastomer having hydrolysable silane groups with a hydroxyl-terminated polysiloxane, a polyalkoxy silane compatibilizer, and a condensation catalyst to thereby form a crosslinkable polymeric composition; and
  (b) at least partially crosslinking said polyolefin elastomer and said hydroxyl-terminated polysiloxane thereby forming an at least partially crosslinked polymeric composition.

DETAILED DESCRIPTION

Various embodiments of the present invention concern crosslinkable polymeric compositions comprising (a) a polyolefin elastomer having hydrolysable silane groups, (b) a hydroxyl-terminated polysiloxane, (c) a polyalkoxy silane compatibilizer, and (d) a condensation catalyst. Further embodiments concern methods for preparing such crosslinkable polymeric compositions, processes for crosslinking such polymeric compositions, and the resulting crosslinked polymeric compositions themselves. Such compositions can be employed in a variety of articles of manufacture, particularly in the wire and cable industry.

Crosslinkable Polymeric Composition

As noted above, one component of the crosslinkable polymeric compositions described herein is a polyolefin elastomer (i.e., an elastomeric polyolefin polymer). As used herein, "elastomer" denotes a polymer having viscoelasticity, and can be either a thermoset or a thermoplastic. A "polyolefin elastomer" is an elastomer having an olefin monomer or combination of olefin monomers as the majority (i.e., greater than 50 mole percent ("mol %")) component of the polymer. In various embodiments, the olefin content of the polyolefin elastomer can be at least 60 mol %, at least 70 mol %, at least 80 mol %, at least 90 mol %, at least 99 mol %, or 100 mol %. "Polymer" means a macromolecular compound prepared by reacting (i.e., polymerizing) monomers of the same or different type. "Polymer" includes homopolymers and interpolymers. As used herein, "homopolymer" denotes a polymer comprising repeating units derived from a single monomer type, but does not exclude residual amounts of other components used in preparing the homopolymer, such as chain transfer agents. "Interpolymer" means a polymer prepared by the polymerization of at least two different monomer types. This generic term includes copolymers (usually employed to refer to polymers prepared from two different monomer types), and polymers prepared from more than two different monomer types (e.g., terpolymers (three different monomer types) and tetrapolymers (four different monomer types)).

Polyolefin elastomers suitable for use herein can be ethylene/alpha-olefin ("α-olefin") elastomers, which can optionally also have polymerized therein one or more types of diene monomers (e.g., an "EPDM" elastomer). Ethylene/α-olefin elastomers are composed of a majority ethylene component and a minority (i.e., less than 50 mol %) comonomer component(s). Thus, in various embodiments, the polyolefin elastomer can be an interpolymer having polymerized therein ethylene and an α-olefin comonomer. In one embodiment, the polyolefin elastomer can be a homogeneously branched linear ethylene/α-olefin copolymer or a homogeneously branched, substantially linear ethylene/α-olefin copolymer. The α-olefin monomers suitable for use in the polyolefin elastomer component include $C_{3-20}$ (i.e., having 3 to 20 carbon atoms) linear, branched, or cyclic α-olefins. Examples of $C_{3-20}$ α-olefins include propene, 1-butene, 4-methyl-1-pentene, 1-hexene, 1-octene, 1-decene, 1-dodecene, 1-tetradecene, 1-hexadecene, and 1-octadecene. The α-olefins can also have a cyclic structure such as cyclohexane or cyclopentane, resulting in an α-olefin such as 3-cyclohexyl-1-propene (allyl cyclohexane) and vinyl cyclohexane. Illustrative ethylene/α-olefin elastomers include ethylene/propylene, ethylene/butene, ethylene/1-hexene, ethylene/1-octene, ethylene/styrene, ethylene/propylene/1-octene, ethylene/propylene/butene, and ethylene/butene/1-octene. In one or more embodiments, the polyolefin elastomer can be selected from the group consisting of an ethylene/propylene copolymer, an ethylene/α-butene copolymer, an ethylene/α-hexene copolymer, an ethylene/α-octene copolymer, an EPDM, or combinations of two or more thereof. In various embodiments, the polyolefin elastomer can be a copolymer of ethylene/α-butene, ethylene/α-hexene, ethylene/α-octene, or combinations of two or more thereof. In an embodiment, the polyolefin elastomer is an ethylene/α-octene copolymer.

Polyolefin elastomers suitable for use herein can have a density ranging from 0.85 to 0.93 $g/cm^3$, 0.86 to 0.92 $g/cm^3$, from 0.86 to 0.91 $g/cm^3$, or from 0.87 to 0.902 $g/cm^3$. Polymer densities provided herein are determined according to ASTM International ("ASTM") method D792. Polyolefin elastomers suitable for use herein can have a melt index ($I_2$) ranging from 0.1 to 50 g/10 min., from 0.5 to 40 g/10 min., or from 1 to 30 g/10 min Melt indices provided herein are determined according to ASTM method D1238. Unless otherwise noted, melt indices are determined at 190° C. and 2.16 Kg (a.k.a., $I_2$). Polyolefin elastomers suitable for use can have a Mooney viscosity ML 1+4 @ 121° C. or 125° C. in the range of from 1 to 90, from 1 to 70, or from 1 to 30. Mooney viscosity is determined according to ASTM D1646, where M represents Mooney, L represents a large rotor, 1 represents a 1-minute preheat time, 4 represents a 4-minute mark after starting the motor at which the reading is taken, and 121 or 125° C. represents the test temperature.

Production processes used for preparing the above-described polyolefin elastomers are wide, varied, and known in the art. Any conventional or hereafter discovered production process for producing polyolefin elastomers having the properties described above may be employed for preparing the polyolefin elastomers described herein.

Commercial examples of polyolefin elastomers suitable for use herein include ENGAGE™ polyolefin elastomers (e.g., ENGAGE™ 8100, 8003, 8400, 8401, 8411, 8480, 8842, 8200, 7447, or 7467 polyolefin elastomers); AFFINITY™ polyolefin plastomers; and NORDEL™ IP EPDM elastomers, all available from The Dow Chemical Company, Midland, Mich., USA. Additional commercially available polyolefin elastomers include EXACT™ plastomers, and VISTALON™ EPDM rubber, all available from ExxonMobil Chemical, Houston, Tex., USA.

In an embodiment, the polyolefin elastomer can comprise a combination of any two or more of the above-described polyolefin elastomers.

As noted above, the polyolefin elastomers suitable for use herein comprise hydrolysable silane groups. Such hydrolysable silane groups can be incorporated in the polyolefin elastomer by grafting an unsaturated hydrolysable silane monomer onto an already-polymerized polyolefin elastomer thereby creating a grafted polyolefin elastomer having hydrolysable silane groups. Suitable unsaturated hydrolysable silane monomers include mono- or poly-alkoxy silane compounds having at least one carbon-carbon double bond available for polymerization. Specific examples of such unsaturated hydrolysable silane monomers include, but are not limited to, vinyl alkoxysilanes (e.g., vinyltrimethoxysilane, vinyltriethyoxysilane, etc.).

Incorporation of the hydrolysable silane group in the polyolefin elastomer can be accomplished using any known or hereafter discovered copolymerization or grafting techniques. By way of example, the hydrolysable silane monomer can be grafted onto a polyolefin elastomer by combining a polyolefin elastomer (e.g., ENGAGE™ 8401) with an unsaturated alkoxysilane (e.g., vinyltrimethoxysilane) and a peroxide (e.g., TRIGONOX™ 101, a 2,5-dimethyl-2,5-di(tert-butylperoxy)hexane). After mixing for a period of time (e.g., 15-30 minutes), the mixture can be extruded at elevated and increasing temperatures (e.g., from 160° C. to 220° C.). Whether copolymerizing or grafting, the amount of unsaturated hydrolysable silane monomer employed in the reaction can range from about 0.5 to about 10 weight percent ("wt %"), from about 1 to about 5 wt %, or from about 1 to about 2 wt %, based on the combined weight of the polyolefin elastomer and the unsaturated hydrolysable silane monomer.

As noted above, the crosslinkable polymeric composition further comprises a hydroxyl-terminated polysiloxane. A polysiloxane, also known as a "silicone," is a polymer generally comprising siloxane-based monomer residue repeating units. As used herein, "siloxane" denotes a monomer residue repeat unit having the structure:

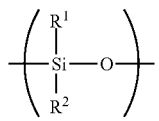

where $R^1$ and $R^2$ are independent hydrocarbyl moieties. The polysiloxane may also comprise branch points such as

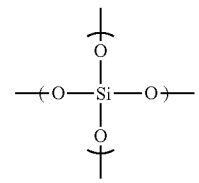

which is known as a "Q" group in silicone chemistry, or

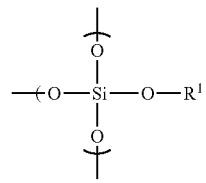

which is known as "T" group in silicone chemistry.

As used herein, the term "hydrocarbyl" denotes a univalent group formed by removing a hydrogen atom from a hydrocarbon (e.g., alkyl groups, such as methyl, or aryl groups, such as phenyl). In one or more embodiments, the siloxane monomer residue can be any dialkyl, diaryl, dialkaryl, or diaralkyl siloxane, having the same or differing alkyl, aryl, alkaryl, or aralkyl moieties. In an embodiment, each of $R^1$ and $R^2$ is independently a $C_1$ to $C_{20}$, $C_1$ to $C_{12}$, or $C_1$ to $C_6$ alkyl, aryl, alkaryl, or aralkyl moiety. In various embodiments, $R^1$ and $R^2$ can have the same or a different number of carbon atoms. In various embodiments, the hydrocarbyl group for each of $R^1$ and $R^2$ is an alkyl group that is saturated and optionally straight-chain. Additionally, the alkyl group in such embodiments can be the same for each of $R^1$ and $R^2$. Non-limiting examples of alkyl groups suitable for use in $R^1$ and $R^2$ include methyl, ethyl, 1-propyl, 2-propyl, 1-butyl, isobutyl, t-butyl, or combinations of two or more thereof.

As noted above, the polysiloxane is hydroxyl terminated. In general, hydroxyl-terminated polysiloxanes comprise hydroxyl groups as the terminal groups of the polymer chain. Any polysiloxane ending in hydroxyl groups may be employed herein, including terminating groups that comprise an additional moiety, such as a hydroxylalkyl group (e.g., hydroxypropyl-terminated polysiloxane). Silanol-terminated polysiloxanes are another example of hydroxyl-terminated polysiloxanes.

In various embodiments, the polysiloxane can be selected from the group consisting of hydroxyl-terminated polydimethylsiloxane ("PDMS"), hydroxyl-terminated poly(ethylmethylsiloxane), and mixtures thereof. Additionally, the polysiloxane can be a mixture of two or more types of polysiloxanes. In certain embodiments, the polysiloxane is hydroxyl-terminated PDMS.

Polysiloxanes suitable for use herein can have a molecular weight of at least 20,000 g/mol and can be up to 150,000 g/mol. Additionally, polysiloxanes suitable for use herein can have a density in the range of from 0.965 g/cm³ to 0.985 g/cm³ at 25° C. Moreover, the polysiloxane employed herein can have a kinematic viscosity at 25° C. in the range of from 1,000 to 200,000 centistokes ("cSt"). Viscosity of the silicone is determined herein according to ASTM D445. Additionally, the polysiloxane can have a hydroxyl functionality of at least 0.01 wt %, at least 0.02 wt %, or at least 0.03 wt %, and can be up to 0.1 wt %, based on the entire weight of the polysiloxane.

An example of a suitable commercially available polysiloxane includes, but is not limited to, DMS-S45, a silanol-terminated polydimethyl siloxane having a viscosity of 50,000 cSt, available from abcr GmbH & Co., Karsruhe, Germany.

As noted above, another component of the crosslinkable polymer composition is a polyalkoxy silane compatibilizer. The polyalkoxy silane component has at least two and up to four alkoxy groups covalently bound to a silane atom. In various embodiments, the polyalkoxy silane compatibilizer is a tetraalkoxy silane compound. Examples of suitable polyalkoxy silane compounds include, but are not limited to, tetramethoxy silane (a.k.a., tetramethyl orthosilicate), tetraethoxy silane (a.k.a., tetraethyl orthosilicate), and the like.

As noted above, a condensation catalyst is included in the crosslinkable polymeric composition. The condensation catalyst can be any compound that catalyzes a moisture crosslinking reaction with hydrolysable silane groups. Condensation catalysts can include carboxylates of metals, such as tin, zinc, iron, lead, and cobalt; organic bases, inorganic acids, and organic acids. Examples of such catalysts include, but are not limited to, dibutyltin dilaurate ("DBTDL"), dibutyltin diacetate, dioctyltin dilaurate, stannous acetate, stannous caprylate, lead naphthenate, zinc caprylate, cobalt naphthenate, ethyl amines, dibutyl amine, hexylamines, pyridine, inorganic acids, such as sulphuric acid and hydrochloric acid, as well as organic acids, such as sulfonic acids (e.g., toluene sulfonic acid), acetic acid, stearic acid and maleic acid. In various embodiments, the catalyst is selected from a tin-based catalyst and a sulfonic acid. In still other embodiments, the catalyst can be a tin carboxylate. Furthermore, in certain embodiments, the catalyst is DBTDL.

The above-described components can be employed in varying concentrations in the crosslinkable polymeric composition. In various embodiments, the polyolefin elastomer can be present in an amount ranging from about 10 to about 90 wt %, from about 20 to about 70 wt %, or from 30 to 50 wt %, based on the combined weight of the polyolefin elastomer and the hydroxyl-terminated polysiloxane. Furthermore, the hydroxyl-terminated polysiloxane can be present in the crosslinkable polymeric composition in an amount ranging from about 10 to about 90 wt %, from about 30 to about 80 wt %, or from 50 to 70 wt %, based on the combined weight of the polyolefin elastomer and the hydroxyl-terminated polysiloxane. Additionally, the polyalkoxy silane compatibilizer can be present in an amount ranging from about 0.1 to 5 parts per hundred resin ("phr") based on 100 weight parts of the combined polyolefin elastomer and hydroxyl-terminated polysiloxane, from about 0.2 to 3 phr, or from 0.5 to 1.5 phr. Also, the condensation catalyst can be present in an amount ranging from about 0.05 to 0.5 phr based on 100 weight parts of the combined polyolefin elastomer and hydroxyl-terminated polysiloxane, from about 0.1 to about 0.3 phr, or from 0.15 to 0.25 phr.

In various embodiments, the crosslinkable polymeric composition may also contain other additives including, but not limited to, processing aids, fillers, coupling agents, ultraviolet absorbers or stabilizers, antistatic agents, nucleating agents, slip agents, plasticizers, lubricants, viscosity control agents, tackifiers, anti-blocking agents, surfactants, extender oils, acid scavengers, flame retardants, and metal deactivators. Additives, other than fillers, are typically used in amounts ranging from 0.01 or less to 10 or more wt % based on total composition weight. Fillers are generally added in larger amounts, although the amount can range from as low as 0.01 or less to 65 or more wt % based on the total composition weight. Illustrative examples of fillers include clays, precipitated silica and silicates, fumed silica, calcium carbonate, ground minerals, aluminum trihydroxide, magnesium hydroxide, and carbon blacks with typical arithmetic mean particle sizes larger than 15 nanometers Another optional additive includes an azo blowing agent to enable foam formation. Such additives enable the formation of a soft, flexible, low-density foam. Examples of such azo blowing agents include, but are not limited to, azodicarbonamide and p,p'-oxbis(benzenesulfonyl hydrazide). Such azo blowing agents can be included in the crosslinkable polymeric composition in an amount ranging from 0.1 to 5 wt %, based on the entire weight of the crosslinkable polymeric composition.

Preparation of Crosslinkable Polymeric Composition

The components described above can be combined in any manner known or hereafter discovered in the art. In various embodiments, the components described above can be melt-mixed at an elevated temperature to form the crosslinkable polymeric composition. Any conventional or hereafter discovered melt mixing equipment may be employed (e.g., a Brabender mixer). The components can also be melt-mixed in an extruder.

An example of a suitable preparation process includes adding a polyolefin elastomer having hydrolysable silane groups to a mixer set at an elevated temperature (e.g., 200° C.). Thereafter, add the hydroxyl-terminated polysiloxane to the mixer and mix for a period of time (e.g., 5 minutes at 50 rpm). Next, the polyalkoxy silane compatibilizer can be added to the mixer following by mixing for an additional time period (e.g., 2-3 minutes). Lastly, the condensation catalyst can be added to the mixer and mixed for an additional time period (e.g., 2-3 minutes). If desired, the resulting crosslinkable polymeric composition can be molded into a shape prior to crosslinking.

In an alternate embodiment, it is possible to form the polyolefin elastomer having hydrolysable silane groups while simultaneously melt-mixing the other components. In this process, a polyolefin elastomer can be combined with an unsaturated hydrolysable silane monomer and a peroxide (such as described above) and mixed in the mixer with the remaining ingredients as just described. The procedure results in the simultaneous graft polymerization of the polyolefin elastomer with the hydrolysable silane groups and formation of the crosslinkable polymeric composition.

Crosslinked Polymeric Composition

The above-described crosslinkable polymeric composition can be crosslinked via any known or hereafter discovered moisture-crosslinking methods. For example, the crosslinkable polymeric composition can be immersed in a water bath at an elevated temperature (e.g., 60° C.) for a period of time (e.g., 8 hours).

The resulting crosslinked polymeric composition can have a compression set of less than 70%, less than 65%, less than 60%, less than 55%, or less than 50% when measured at any of 70° C., 25° C., or −25° C. Compression set is determined herein according to International Organization for Standardization ("ISO") method 815.

The resulting crosslinked polymeric composition can have a Shore A hardness of less than 70, less than 65, less than 60, or less than 65. Shore hardness is determined herein according to Deutsches Institute Normung ("DIN") method A 53505 (3 sec.).

The crosslinked polymeric composition can further have a tensile strength ranging from 0.1 to 15 MPa, or from 0.5 to 7.5 MPa. Tensile strength is determined herein according to ISO 37 T2.

The crosslinked polymeric composition can have an elongation at break ranging from 100 to 1,000%, or from 200 to 500%. Elongation at break is determined herein according to ISO 37 T2.

The crosslinked polymeric composition can have a volume swell when tested for oil resistance in IRM 903 at 70° C. for 22 hours of less than 300 percent by weight. Volume swell is determined herein according to ISO 1817.

Coated Conductor

A cable comprising a conductor and an insulation layer can be prepared employing the above-described crosslinkable polymeric composition. "Cable" and "power cable" mean at least one wire or optical fiber within a sheath, e.g., an insulation covering and/or a protective outer jacket. Typically, a cable is two or more wires or optical fibers bound together, typically in a common insulation covering and/or protective jacket. The individual wires or fibers inside the sheath may be bare, covered or insulated. Combination cables may contain both electrical wires and optical fibers. Typical cable designs are illustrated in U.S. Pat. Nos. 5,246,783, 6,496,629 and 6,714,707. "Conductor" denotes one or more wire(s) or fiber(s) for conducting heat, light, and/or electricity. The conductor may be a single-wire/fiber or a multi-wire/fiber and may be in strand form or in tubular form. Non-limiting examples of suitable conductors include metals such as silver, gold, copper, carbon, and aluminum or bimetallic alloys. The conductor may also be optical fiber made from either glass or plastic.

Such a cable can be prepared with various types of extruders (e.g., single or twin screw types) by extruding the crosslinkable polymeric composition onto the conductor, either directly or onto an interceding layer. A description of a conventional extruder can be found in U.S. Pat. No. 4,857,600. An example of co-extrusion and an extruder therefore can be found in U.S. Pat. No. 5,575,965.

Following extrusion, the extruded cable can pass into a heated cure zone downstream of the extrusion die to aid in cross-linking the crosslinkable polymeric composition and thereby produce a crosslinked polymeric composition. The heated cure zone can be a water bath maintained at a temperature in the range of 50 to 100° C. Alternatively, the extruded cable can be cured off-line in a separate heated sauna chamber or can be allowed to cure at ambient temperature in air.

Alternating current cables can be prepared according to the present disclosure, which can be low-voltage or medium-voltage cables.

Test Methods

Shore Hardness

Determine Shore (A and D) hardness according to DIN A 53505 (3 sec) (Comparative Samples CS7-16 and Samples S1-10) or ASTM D2240 (Comparative Samples CS1-6) using molded specimens of 3×2-mm thickness.

Tensile Properties

Determine tensile strength and tensile elongation according to ISO 37 T2.

Density

Density is determined according to ASTM D 792.

Melt Index

Melt index, or $I_2$, is measured in accordance by ASTM D 1238, condition 190° C./2.16 kg, and is reported in grams eluted per 10 minutes.

Compression Set

Determine compression set according to ISO 815.

Volume Swell

Volume swell is determined herein according to ISO 1871 using IRM 903 for 22 hours at 70° C.

Crystallinity & Melting Point

Determine crystallinity and melting point by Differential Scanning Calorimetry (DSC) using the following conditions on a Mettler Toledo DSC822e:
Start: −60° C.
Isotherm: 5 min
Heat rate: 10° C./min.
Heat end: 200° C.
Isotherm: 5 min
Cooling rate: 10° C./min.
Purge gas: Nitrogen
Purge flow: 50 ml/min.
Sample weight: approx 8 mg For these measurements, ~8 mg of sample is placed in the sample chamber and then heated to 200° C. at a rate of 10° C. per minute. The sample is then cooled at 10° C./min to −60° C. The second heating curve is then recorded from −60° C. up to 200° C. The heating rate is again 10° C./min. From the second heating trace, both the peak of the melting endotherm and ΔH the heat of fusion, calculated from the area of the melting peak, are recorded. The resin crystallinity is calculated by using 292 J/g as the value of 100% crystallinity.

Reagents

In the Examples detailed below, the following reagents are employed:

ENGAGE™ 7467 is an ethylene/butene polyolefin elastomer having a density of about 0.862 g/cm$^3$, a crystallinity of about 12%, a melting point of about 34° C., and a melt index of about 1.2, and is commercially available from The Dow Chemical Company, Midland, Mich., USA.

ENGAGE™ 8100 is an ethylene/octene polyolefin elastomer having a density of about 0.870 g/cm$^3$, a crystallinity of about 18%, a melting point of about 60° C., and a melt index of about 1, and is commercially available from The Dow Chemical Company, Midland, Mich., USA.

ENGAGE™ 8200 is an ethylene/octene polyolefin elastomer having a density of about 0.870 g/cm$^3$, a crystallinity of about 19%, a melting point of about 59° C., and a melt index of about 5, and is commercially available from The Dow Chemical Company, Midland, Mich., USA.

ENGAGE™ 8400 is an ethylene/octene polyolefin elastomer having a density of about 0.870 g/cm$^3$, a crystallinity of about 21%, a melting point of about 65° C., and a melt index of about 30, and is commercially available from The Dow Chemical Company, Midland, Mich., USA.

ENGAGE™ 8401 is an ethylene/octene polyolefin elastomer having a density of about 0.885 g/cm$^3$, a crystallinity of about 25%, a melting point of about 80° C., and a melt index of about 30, and is commercially available from The Dow Chemical Company, Midland, Mich., USA.

ENGAGE™ 8480 is an ethylene/octene polyolefin elastomer having a density of about 0.902 g/cm$^3$, a crystallinity of about 33%, a melting point of about 99° C., and a melt index of about 1, and is commercially available from The Dow Chemical Company, Midland, Mich., USA.

DMS-T46 is trimethylsiloxy-terminated polydimethylsiloxane and is commercially available from abcr GmbH & Co., Karsruhe, Germany.

DMS-S45 is silanol-terminated polydimethylsiloxane and is commercially available from abcr GmbH & Co., Karsruhe, Germany.

The tetraethoxy silane (a.k.a., tetraethyl orthosilicate) is commercially available from Sigma-Aldrich, St. Louis, Mo., USA.

Dibutyltin dilaurate is commercially available from Sigma-Aldrich, St. Louis, Mo., USA.

Vinyltrimethoxysilane is commercially available from Sigma-Aldrich, St. Louis, Mo., USA.

TRIGONOX™ 101 is 2,5-dimethyl-2,5-di(t-butylperoxy) hexane and is available from AkzoNobel N.V., Amsterdam, Netherlands.

EXAMPLES

Example 1—Uncrosslinked Polyolefin Elastomers (Comparative)

Analyze six commercially available polyolefin elastomers according to the Test Methods outlined above. Comparative Sample 1 (CS1) is ENGAGE™ 7467. Comparative Sample 2 (CS2) is ENGAGE™ 8100. Comparative Sample 3 (CS3) is ENGAGE™ 8200. Comparative Sample 4 (CS4) is ENGAGE™ 8400. Comparative Sample 5 (CS5) is ENGAGE™ 8401. Comparative Sample 6 (CS6) is ENGAGE™ 8480. Analysis results are provided in Table 1, below.

TABLE 1

Properties of Uncrosslinked Polyolefin Elastomers

| Sample No. | Shore A Hardness | Tensile Strength (MPa) | Elongation at Break (%) | Compression Set @ 70° C. (%) | Compression Set @ 25° C. (%) | Compression Set @ −25° C. (%) | Volume Swell (%) |
|---|---|---|---|---|---|---|---|
| CS1 | 52 | 1.2 | 450 | NM | NM | — | NM |
| CS2 | 52 | 9.8 | >600 | 100 | 28 | — | NM |
| CS3 | 66 | 5.7 | >600 | 100 | 34 | 90 | Dissolves |
| CS4 | 72 | 2.8 | >600 | 100 | 35 | 88 | Dissolves |
| CS5 | 84 | 8.5 | >600 | 100 | 33 | 85 | Dissolves |
| CS6 | 89 | 24.8 | >600 | 100 | 32 | — | NM |

NM = Not Measured

As can be seen in Table 1, uncrosslinked polyolefin elastomers exhibit poor (high) compression set values at elevated temperatures and at low temperatures.

Example 2—Silane-Crosslinked Polyolefin Elastomers (Comparative)

Prepare three silane-crosslinked (Si-XL) polyolefin elastomer Comparative Samples (CS7-9) by first preparing a silane-grafted polyolefin elastomer. Mix the polyolefin elastomer with 1.5 wt % vinyltrimethoxysilane ("VTMOS") and 0.1 wt % Triganox 101 for 15 to 30 minutes, after which time the reactive ingredients are absorbed into the elastomer. The elastomer is then extruded on a single screw extruder using the following temperature profile: 160° C., 180° C., 190° C., 200° C., 220° C. and a melt temperature around 220° C. RPM and residence time are optimized to allow full decomposition of the peroxide and grafting of the VTMOS (typically around 30 rpm and 4 to 7 minutes residence time). The silane-grafted polyolefin elastomer is then pelletized.

The resulting silane-grafted polyolefin elastomers are then crosslinked. Crosslinking is performed by first preparing 2-mm molded plates of the silane-grafted polyolefin elastomer in a molding press operated at a temperature of 190° C. for 10 minutes. Next, the molded plates of silane-grafted polyolefin elastomer are placed in a waterbath at 60° C. for 8 hours, and then allowed to equilibrate overnight.

CS7 is prepared using ENGAGE™ 8200 as the starting polyolefin elastomer. CS8 is prepared using ENGAGE™ 8400 as the starting polyolefin elastomer. CS9 is prepared using ENGAGE™ 8401 as the starting polyolefin elastomer. The resulting silane-crosslinked polyolefin elastomers are analyzed in accordance with the above-described Test Methods. Results are provided in Table 2, below.

TABLE 2

Properties of Si-XL Polyolefin Elastomers

| Sample No. | Tensile Strength (MPa) | Elongation at Break (%) | Compression Set @ 70° C. (%) | Compression Set @ 25° C. (%) | Compression Set @ −25° C. (%) | Volume Swell (%) |
|---|---|---|---|---|---|---|
| CS7 | 6.4 | 420 | 49 | 28 | 90 | 314 |
| CS8 | 6.4 | 450 | 60 | 28 | 75 | 400 |
| CS9 | 10.4 | 400 | 70 | 16 | 82 | 315 |

In comparison to the uncrosslinked Comparative Samples of Example 1 (CS1-6), an improvement is seen in the volume swell and the room-temperature compression set; however, the high-temperature and low-temperature compression set data remain high.

Example 3—Polyolefin Elastomer Blends with Trimethylsiloxy-Terminated Polysiloxane (Comparative)

Prepare four Comparative Samples (CS10-13) by blending either ENGAGE™ 8401 or silane-grafted ENGAGE™ 8401 with a trimethylsiloxy-terminated polydimethylsiloxane ("TMS-PDMS") according to the formulations shown in Table 3, below. The silane-grafted ENGAGE™ 8401 is the same as prepared in Example 2, but without undergoing the crosslinking step.

TABLE 3

Compositions of Comparative Samples CS10-13

| Sample No. | ENGAGE ™ 8401 (g) | Si-g-ENGAGE ™ 8401 (g) | TMS-PDMS (g) | Dibutyltin dilaurate (g) | Tetraethoxy silane (g) |
|---|---|---|---|---|---|
| CS10 | 20 | — | 30 | — | — |
| CS11 | 30 | — | 20 | — | — |
| CS12 | — | 20 | 30 | 0.1 | — |
| CS13 | — | 30 | 20 | 0.2 | 1 |

Prepare CS10-13 by first transferring the polyolefin elastomer to a small Brabender internal mixer. Thereafter, add the TMS-PDMS to the mixer and mix thoroughly at 200° C. for 5 minutes at 50 rpm. Next, add in the tetraethoxy silane (if applicable) and mix again for an additional 2-3 minutes. Finally, add in the dibutyltin dilaurate (if applicable) and mix again for an additional 2-3 minutes. Thereafter, remove the mixture and place in a molding press to be molded at 190° C. for 10 minutes into a 2-mm plate. Subject CS12 and CS13 to the cros slinking procedure described above in Example 2. Analyze CS10-13 according to the Test Methods described above. The results are provided in Table 4, below.

TABLE 4

Properties of Comparative Samples CS10-13

| Sample No. | Shore A Hardness | Tensile Strength (MPa) | Elongation at Break (%) | Compression Set @ 70° C. (%) | Compression Set @ 25° C. (%) | Compression Set @ −25° C. (%) | Volume Swell (%) |
|---|---|---|---|---|---|---|---|
| CS10 | NP | NP | NP | NP | NP | NP | NP |
| CS11 | 65 | 3.8 | 815 | 100 | 36 | 99 | NM |
| CS12 | NP | NP | NP | NP | NP | NP | NP |
| CS13 | 59 | 3.3 | 250 | 74 | 36 | 89 | NM |

NM = Not Measured
NP = Not possible to mold plate

As seen in Table 4, the use of TMS-PDMS did not improve either the high-temperature or the low-temperature compression sets.

Example 4—Non-Silane-Grafted Polyolefin Elastomer Blend with Silanol-Terminated Polysiloxane (Comparative)

Prepare a Comparative Sample (CS14) by blending 20 g of ENGAGE™ 8401 with 30 g of silanol-terminated polydimethylsiloxane (DMS-S45), 0.1 g of dibutyltin dilaurate, and 0.5 g of tetraethoxy silane using the blending procedure described above in Example 3 and the crosslinking procedure described in Example 2. Analyze the resulting blend according to the Test Methods described above. The results are provided in Table 5, below.

TABLE 5

Properties of Comparative Sample CS14

| Sample No. | Shore A Hardness | Tensile Strength (MPa) | Elongation at Break (%) | Compression Set @ 70° C. (%) | Compression Set @ 25° C. (%) | Compression Set @ −25° C. (%) |
|---|---|---|---|---|---|---|
| CS14 | 22 | 0.4 | 65 | 87 | 47 | 87 |

As seen in Table 5, the use of a non-silane-grafted polyolefin elastomer did not improve either the high-temperature or the low-temperature compression sets.

Example 5—Silane-Grafted Polyolefin Elastomer Blend with Silanol-Terminated Polysiloxane without Catalyst or Compatibilizer (Comparative)

Prepare a Comparative Sample (CS15) by blending 20 g of silane-grafted ENGAGE™ 8401 (as prepared in Example 2) with 30 g of silanol-terminated polydimethylsiloxane (DMS-S45) using the blending procedure described in Example 3. Thereafter, subject the blend to the crosslinking procedure described in Example 2. Analyze the resulting blend according to the Test Methods described above. The results are provided in Table 6, below.

TABLE 6

Properties of Comparative Sample CS15

| Sample No. | Tensile Strength (MPa) | Elongation at Break (%) | Compression Set @ 70° C. (%) | Compression Set @ 25° C. (%) | Compression Set @ −25° C. (%) |
|---|---|---|---|---|---|
| CS15 | 0.8 | 180 | 83 | 33 | 94 |

As seen in Table 6, blending and curing the silane-grafted polyolefin elastomer/silanol-terminated polysiloxane in the absence of a moisture cure catalyst and compatibilizer does not improve either the high-temperature or low-temperature compression set data.

Example 6—Silane-Grafted Polyolefin Elastomer Blend with Catalyst and Compatibilizer without Silanol-Terminated Polysiloxane (Comparative)

Prepare a Comparative Sample (CS16) by blending 50 g of silane-grafted ENGAGE™ 8401 (as prepared in Example 2) with 0.1 g of dibutyltin dilaurate and 0.5 g of tetraethoxy silane using the blending procedure described in Example 3. Thereafter, subject the blend to the crosslinking procedure described in Example 2. Analyze the resulting blend according to the Test Methods described above. The results are provided in Table 7, below.

TABLE 7

Properties of Comparative Sample CS16

| Sample No. | Shore A Hardness | Tensile Strength (MPa) | Elongation at Break (%) | Compression Set @ 70° C. (%) | Compression Set @ 25° C. (%) | Compression Set @ −25° C. (%) |
|---|---|---|---|---|---|---|
| CS16 | 83 | 12.5 | 575 | 70 | 18 | 86 |

As seen in Table 7, blending and curing the silane-grafted polyolefin elastomer with a condensation catalyst and compatibilizer but in the absence of a silanol-terminated polysiloxane does not improve either the high-temperature or low-temperature compression set data.

Example 7—Silane-Grafted Polyolefin Elastomer Blend with Silanol-Terminated Polysiloxane, Catalyst and Compatibilizer Prepare ten Samples (S1-10) according to the formulations shown in Table 8, below, by first preparing a silane-grafted polyolefin elastomer as described in Example 2 (without crosslinking). Thereafter, blend silane-grafted polyolefin elastomer with the silanol-terminated polysiloxane (DMS-S45), condensation catalyst, and polyalkoxy silane compatibilizer using the blending procedure described above in Example 3. After blending, the mixture is removed from the mixer and cured by placing the mixture in a waterbath at a temperature of 60° C. for 8 hours. The crosslinked composition is then allowed to equilibrate overnight.

TABLE 8

Compositions of Comparative Samples CS10-13

| Sample No. | Si-g-ENGAGE ™ 8401 (g) | Silanol-Terminated PDMS (g) | Dibutyltin dilaurate (g) | Tetraethoxy silane (g) |
|---|---|---|---|---|
| S1 | 45 | 5 | 0.1 | 0.5 |
| S2 | 40 | 10 | 0.1 | 0.5 |
| S3 | 35 | 15 | 0.1 | 0.5 |
| S4 | 30 | 20 | 0.1 | 0.5 |
| S5 | 25 | 25 | 0.1 | 0.5 |
| S6 | 20 | 30 | 0.1 | 0.5 |
| S7 | 20 | 30 | 0.2 | 1 |
| S8 | 15 | 35 | 0.1 | 0.5 |
| S9 | 10 | 40 | 0.1 | 0.5 |
| S10 | 5 | 45 | 0.1 | 0.5 |

Analyze Samples S1 through S10 according to the Test Methods described above. The results are provided in Table 9, below.

TABLE 9

Properties of Samples S1-10

| Sample No. | Shore A Hardness | Tensile Strength (MPa) | Elongation at Break (%) | Compression Set @ 70° C. (%) | Compression Set @ 25° C. (%) | Compression Set @ −25° C. (%) | Volume Swell (%) |
|---|---|---|---|---|---|---|---|
| S1 | 82 | 11.3 | 580 | 61 | 17 | NM | NM |
| S2 | 80 | 8.9 | 420 | 65 | 26 | 88 | NM |
| S3 | 68 | 7.1 | 525 | 68 | 24 | NM | NM |
| S4 | 53 | 1.9 | 280 | 58 | 21 | 52 | NM |
| S5 | 48 | 1.8 | 225 | 38 | 21 | 51 | NM |
| S6 | 26 | 1.3 | 200 | 38 | 19 | 48 | NM |
| S7 | 10 | 0.8 | 225 | 46 | 25 | 52 | 164 |
| S8 | 4 | 0.4 | 470 | 40 | 20 | NM | NM |
| S9 | 4 | 0.4 | 525 | 23 | 15 | 27 | NM |
| S10 | 1 | 0.4 | 920 | 40 | 15 | 38 | NM |

NM = Not Measured

As seen in Table 8, the crosslinked blend of a silane-grafted polyolefin elastomer, a silanol-terminated polysiloxane, a condensation catalyst, and a polyalkoxy silane compatibilizer provides improved compression set data, even at high and low temperatures. Additionally, such compositions provide desired softness, particularly with increasing amounts of silanol-terminated polysiloxane.

The invention claimed is:

1. A crosslinkable polymeric composition, comprising:
a polyolefin elastomer having hydrolysable silane groups, wherein said polyolefin elastomer is a silane-grafted ethylene/α-olefin polyolefin elastomer;
a hydroxyl-terminated polysiloxane;
a polyalkoxy silane compatibilizer; and
a condensation catalyst;
wherein the polyolefin elastomer is present in the crosslinkable polymeric composition in an amount ranging from about 30 to about 50 wt % based on the combined weight of the polyolefin elastomer and the hydroxyl-terminated polysiloxane,
wherein the hydroxyl-terminated polysiloxane is present in the crosslinkable polymeric composition in an amount ranging from about 50 to about 70 wt % based on the combined weight of the polyolefin elastomer and the hydroxyl-terminated polysiloxane,
wherein the polyalkoxy silane compatibilizer is a tetraalkoxy silane and is present in the crosslinkable polymeric composition in an amount ranging from 0.5 to 3 parts per hundred parts of the combined weight of the polyolefin elastomer and the hydroxyl-terminated polysiloxane, and wherein said crosslinkable polymeric composition has a compression set after being crosslinked at 60° C. for 8 hours of less than 50%, wherein compression set is measured at 70° C. according to ISO 815,
wherein the condensation catalyst is a tin-based condensation catalyst and is present in the crosslinkable polymeric composition in an amount ranging from 0.1 to 0.5 parts per hundred parts of the combined weight of the polyolefin elastomer and the hydroxyl-terminated polysiloxane.

2. The crosslinkable polymeric composition of claim 1, wherein said hydroxyl-terminated polysiloxane has a molecular weight of at least 20,000 g/mol.

3. The crosslinkable polymeric composition of claim 1, wherein said polyalkoxy silane compatibilizer is tetraethoxy silane, and wherein said condensation catalyst is dibutyltin dilaurate.

4. The crosslinkable polymeric composition of claim 3, wherein said tetraethoxy silane is present in the crosslinkable polymeric composition in an amount ranging from 0.5 to 1.5 parts per hundred parts of the combined weight of the polyolefin elastomer and the hydroxyl-terminated polysiloxane, and wherein said dibutyltin dilaurate is present in the crosslinkable polymeric composition in an amount ranging from 0.15 to 0.25 parts per hundred parts of the combined weight of the polyolefin elastomer and the hydroxyl-terminated polysiloxane.

5. A crosslinked polymeric composition prepared by least partially crosslinking said crosslinkable polymeric composition of claim 1, wherein said at least partially crosslinked polymeric composition has a shore A hardness of less than 60.

* * * * *